US008735507B2

(12) United States Patent
Greyson et al.

(10) Patent No.: US 8,735,507 B2
(45) Date of Patent: May 27, 2014

(54) CROSSLINKABLE COMPOSITION AND METHOD OF PRODUCING THE SAME

(71) Applicants: Rohm and Haas Company, Philadelphia, PA (US); Dow Global Technologies LLC, Midland, MI (US)

(72) Inventors: Eric Greyson, Blue Bell, PA (US); John N. Argyropoulos, Midland, MI (US); Paul Foley, Traverse, MI (US); Andrew Swartz, Fleetwood, PA (US); Nahrain E. Kamber, Penllyn, PA (US); Caroline Slone, Maple Glen, PA (US); Manesh N. Sekharan, Midland, MI (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/728,037

(22) Filed: Dec. 27, 2012

(65) Prior Publication Data

US 2013/0172472 A1    Jul. 4, 2013

Related U.S. Application Data

(63) Continuation-in-part of application No. 13/160,604, filed on Jun. 15, 2011.

(60) Provisional application No. 61/355,266, filed on Jun. 16, 2010.

(51) Int. Cl.
| | |
|---|---|
| *C08G 8/04* | (2006.01) |
| *C08G 12/04* | (2006.01) |
| *C08L 75/10* | (2006.01) |
| *C08K 5/05* | (2006.01) |

(52) U.S. Cl.
USPC ............ 525/472; 524/391; 524/598; 528/245

(58) Field of Classification Search
USPC ............ 525/402, 472; 528/245; 524/391, 598
See application file for complete search history.

(56) References Cited

U.S. PATENT DOCUMENTS

| 5,162,415 | A | 11/1992 | Rehmer et al. |
|---|---|---|---|
| 6,040,062 | A | 3/2000 | McGee et al. |
| 6,235,858 | B1 | 5/2001 | Swarup et al. |
| 6,265,028 | B1 * | 7/2001 | Zhao et al. .................. 427/372.2 |
| 6,464,923 | B2 * | 10/2002 | Tsuji et al. .................... 264/330 |
| 6,541,594 | B2 * | 4/2003 | Ohrbom et al. ................. 528/45 |
| 6,812,316 | B2 * | 11/2004 | Ohrbom et al. ................. 528/45 |
| 7,423,077 | B2 * | 9/2008 | Wilke et al. .................... 524/100 |
| 2010/0179272 | A1 * | 7/2010 | Balzarek et al. .............. 524/503 |
| 2010/0256292 | A1 * | 10/2010 | Jakob et al. .................... 524/548 |
| 2011/0313091 | A1 | 12/2011 | Argyropoulos et al. |

FOREIGN PATENT DOCUMENTS

| WO | WO 2008110242 A1 * | 9/2008 | ............. C08L 39/00 |
|---|---|---|---|
| WO | WO 2009000379 A1 * | 12/2008 | ............. C08L 39/00 |

OTHER PUBLICATIONS

Guthrie (Hydrolysis of esters of oxy acids: pKa values for strong acids, Bronsted relationship for attack of wter at methyl; free energies of hydrolsys of esters of oxy acid; and a linear relationship between free energet of hydrolysis and pKa holding over a range of 20 pK units, Can. J of Chem. 56, 2347, Sep. 1978).*
Duda et al, Modeling of Composite latex Particle Morphology by Off-Lattice Monte Carlo Simulation, Langmuir 2005, 21, 1096-1102.

* cited by examiner

*Primary Examiner* — Randy Gulakowski
*Assistant Examiner* — Christopher M Rodd

(57) ABSTRACT

The instant invention provides a crosslinkable aqueous composition, method of producing the same, crosslinked compositions, and method of producing the same. The crosslinkable composition comprising: an aqueous dispersion comprising; (a) water; (b) a polycarbamate comprising at least an average of 2.0 carbamate functional groups; (c) a polyaldehyde comprising at least two aldehyde groups; (d) an acid catalyst; and (e) optionally one or more surfactants; wherein said aqueous dispersion has a pH in the range of less than 7; and wherein said composition is capable of being crosslinked at a temperature in range of less than 80° C. upon substantial removal of water.

21 Claims, No Drawings

CROSSLINKABLE COMPOSITION AND METHOD OF PRODUCING THE SAME

CROSS-REFERENCE TO RELATED APPLICATIONS

The present application is a continuation-in-part application of the U.S. application Ser. No. 13/160,604, filed on Jun. 15, 2011, entitled "AMBIENT TEMPERATURE CURABLE ISOCYANATE-FREE COMPOSITIONS FOR PREPARING CROSSLINKABLE POLYURETHANES." the teachings of which are incorporated by reference herein, as if reproduced in full hereinbelow, which claims priority from the U.S. Provisional Application No. 61/355,266, filed on Jun. 16, 2010, entitled "AMBIENT TEMPERATURE CURABLE ISOCYANATE-FREE COMPOSITIONS FOR PREPARING CROSSLINKABLE POLYURETHANES." the teachings of which are incorporated by reference herein, as if reproduced in full hereinbelow.

FIELD OF INVENTION

The instant invention relates to a crosslinkable aqueous composition, method of producing the same, crosslinked compositions, and method of producing the same.

BACKGROUND OF THE INVENTION

Low molecular polymers (Mn of 500-10,000) containing hydroxyl-functionality (also referred to as polyols) are widely used in coating applications and are cured at room temperature or elevated temperatures using a variety of crosslinking technologies. The most typical crosslinkers are polyisocyanates and aminoplast resins. Polyisocyanate crosslinkers offer the advantages of low temperature cure and provide coatings with superior properties, but suffer from high toxicity, high cost and the limitation of balancing pot life with dry time. Aminoplast resins are often used as crosslinkers because they offer a good balance of lower cost and good coating performance, but curing at higher temperature is often required and they suffer from the toxicity of residual formaldehyde.

Accordingly there is a need for a new crosslinking technology under ambient conditions (or low temperature bakes, e.g. 60° C.). Furthermore there is need for coating properties when coating compositions are crosslinked while maintaining lower levels of toxicity.

SUMMARY OF THE INVENTION

The instant invention provides a crosslinkable aqueous composition, method of producing the same, crosslinked compositions, and method of producing the same.

In one embodiment, the instant invention provides crosslinkable composition comprising: an aqueous dispersion comprising; (a) water; (b) a polycarbamate comprising at least an average of 2.0 carbamate functional groups; (c) a polyaldehyde comprising at least two aldehyde groups; (d) an acid catalyst; and (e) optionally one or more surfactants; wherein said aqueous dispersion has a pH in the range of less than 7; and wherein said composition is capable of being crosslinked at a temperature in range of less than 80° C. upon removal of a substantial portion of water.

A crosslinked composition derived from the inventive crosslinkable aqueous composition comprising carbamate ester linkages prepared by the reaction of: (a) a polycarbamate comprising at least an average of 2.0 carbamate functional groups; and (b) a polyaldehyde comprising at least two aldehyde groups; in the presence of (c) an acid catalyst; and (d) optionally one or more surfactants; wherein said initial aqueous dispersion has a pH in the range of less than 7; and wherein said composition is crosslinked at a temperature in range of less than 80° C.

In an alternative embodiment, the instant invention further provides a process for producing a crosslinkable composition comprising: (1) selecting a polycarbamate dispersion comprising (a) a polycarbamate comprising at least an average of 2.0 carbamate functional groups, (b) water, and (c) an acid catalyst; (2) selecting a polyaldehyde comprising at least two aldehyde groups; (3) contacting said polycarbamate dispersion with the polyaldehyde; (4) thereby forming an aqueous dispersion, wherein said aqueous dispersion has a pH in the range of less than 7; (5) thereby producing said crosslinkable composition, wherein said crosslinkable composition is capable of being crosslinked at a temperature in range of less than 80° C.

In another alternative embodiment, the instant invention further provides a process for producing a crosslinkable composition comprising: (1) selecting a polycarbamate dispersion comprising a polycarbamate comprising at least an average of 2.0 carbamate functional groups, and water; (2) selecting a polyaldehyde comprising at least two aldehyde groups; (3) selecting an acid catalyst; (4) contacting said polycarbamate dispersion, polyaldehyde, and acid catalyst in the presence of water; (5) thereby forming an aqueous dispersion, wherein said aqueous dispersion has a pH in the range of less than 7; (6) thereby producing said crosslinkable composition, wherein said crosslinkable composition is capable of being crosslinked at a temperature in range of less than 80° C.

In another alternative embodiment, the instant invention further provides a coating layer derived from the inventive crosslinkable composition.

In an alternative embodiment, the instant invention provides a crosslinkable composition, a crosslinked composition, method of producing the same, in accordance with any of the preceding embodiments, except that the crosslinkable composition is used as an adhesive, primer, sealant, caulk, stain, and/or filler.

In an alternative embodiment, the instant invention provides a crosslinkable composition, a crosslinked composition, method of producing the same, in accordance with any of the preceding embodiments, except that the crosslinkable composition is applied to at least one surface of a substrate such as metal, plastic, wood, concrete, asphalt, hair, paper, leather, glass, rubber, foam and/or textiles.

In an alternative embodiment, the instant invention provides a crosslinkable composition, a crosslinked composition, method of producing the same, in accordance with any of the preceding embodiments, except that the aqueous dispersion has a pH in the range of less than 6, for example less than 5, or less than 4, or from 1 to 4, or from 2 to 4.

In an alternative embodiment, the instant invention provides a crosslinkable composition, a crosslinked composition, method of producing the same, in accordance with any of the preceding embodiments, except that the polycarbamate is the condensation product of one or more polyols with an unsubstituted carbamic acid alkyl ester or urea.

In an alternative embodiment, the instant invention provides a crosslinkable composition, a crosslinked composition, method of producing the same, in accordance with any of the preceding embodiments, except that the polyol is an acrylic, styrene-acrylic, styrene-butadiene, ethylenevinylacetate, vinylacetate, vinyl, ester, urethane, alkyd, ether or carbonate polymer or oligomer thereof.

In an alternative embodiment, the instant invention provides a crosslinkable composition, a crosslinked composition, method of producing the same, in accordance with any of the preceding embodiments, except that the polycarbamate has carbamate groups and hydroxyl groups in a ratio of the equivalents of carbamate groups to the number of equivalents of hydroxyl functional groups of from 1:10 to 20:1.

In an alternative embodiment, the instant invention provides a crosslinkable composition, a crosslinked composition, method of producing the same, in accordance with any of the preceding embodiments, except that the polycarbamate is prepared through free radical emulsion or suspension addition polymerization of one or more α,β-ethylenically unsaturated monomers at least one of which comprises carbamate functionality.

In an alternative embodiment, the instant invention provides a crosslinkable composition, a crosslinked composition, method of producing the same, in accordance with any of the preceding embodiments, except that the polyaldehyde has from 2 to 20 carbon atoms.

In an alternative embodiment, the instant invention provides a crosslinkable composition, a crosslinked composition, method of producing the same, in accordance with any of the preceding embodiments, except that the polyaldehyde has greater than 20 carbon atoms, with the proviso that a polyaldehyde having greater than 20 carbon atoms has at least one aldehyde group for every 30 carbon atoms.

In an alternative embodiment, the instant invention provides a crosslinkable composition, a crosslinked composition, method of producing the same, in accordance with any of the preceding embodiments, except that the polyaldehyde is selected from the group consisting of (cis,trans)-1,4-cyclohexanedicarboxyaldehydes, (cis,trans)-1,3-cyclohexanedicarboxyaldehydes, glutaraldeyde, glyoxal, combinations thereof, and/or mixtures thereof.

In an alternative embodiment, the instant invention provides a crosslinkable composition, a crosslinked composition, method of producing the same, in accordance with any of the preceding embodiments, except that the acid catalyst has a pKa of less than 6.0, for example a pKa of less than 4.0.

In an alternative embodiment, the instant invention provides a crosslinkable composition, a crosslinked composition, method of producing the same, in accordance with any of the preceding embodiments, except that the acid catalyst is a Lewis acid.

In an alternative embodiment, the instant invention provides a crosslinkable composition, a crosslinked composition, method of producing the same, in accordance with any of the preceding embodiments, except that the composition further comprises a curing inhibitor comprising alcohol.

In an alternative embodiment, the instant invention provides a crosslinkable composition, a crosslinked composition, method of producing the same, in accordance with any of the preceding embodiments, except that the alcohol is selected from the group consisting of ethanol, 1-propanol, 1-butanol, 1-pentanol, Ethylene glycol monoalkyl ethers, diethylene glycol monoalkyl ethers, propylene glycol monoalkyl ethers and dipropylene glycol monoalkyl ethers, 2,2,4-Trimethyl-1,3-pentanediol monoisobutyrate, combinations thereof, and mixture thereof.

In an alternative embodiment, the instant invention provides a crosslinkable composition, a crosslinked composition, method of producing the same, in accordance with any of the preceding embodiments, except that the carbamate functional group has a radical structure of formula of:

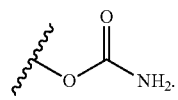

In an alternative embodiment, the instant invention provides a crosslinkable composition, a crosslinked composition, method of producing the same, in accordance with any of the preceding embodiments, except that the acid catalyst is a functional group which is incorporated into the backbone of the polycarbamate.

DETAILED DESCRIPTION OF THE INVENTION

The instant invention provides a crosslinkable aqueous composition, method of producing the same, crosslinked compositions, and method of producing the same. The crosslinkable aqueous composition according to the present invention comprises: an aqueous dispersion comprising; (a) water; (b) a polycarbamate comprising at least an average of 2.0 carbamate functional groups; (c) a polyaldehyde comprising at least two aldehyde groups; (d) an acid catalyst; and (e) optionally one or more surfactants; wherein said aqueous dispersion has a pH in the range of less than 7; and wherein said composition is capable of being crosslinked at a temperature in range of less than 80° C. upon removal of a substantial portion of the water.

The crosslinkable aqueous composition comprises up to 100 percent by weight of the aqueous dispersion, for example, from 10 to 100 percent by weight the aqueous dispersion, or in the alternative from 65 to 100 percent by weight of the aqueous dispersion. The crosslinkable aqueous composition may further comprise one or more additional film forming or non film forming polymers, extenders, emulsifiers, coalescing agents, plasticizers, antifreezes, curing agents, buffers, neutralizers, thickeners, rheology modifiers, humectants, wetting agents, biocides, anti-foaming agents, UV adsorbers, fluorescent brighteners, light or heat stabilizers, chelating agents, dispersants, tackifiers, colorants, waxes, water-repellants and pigments.

The aqueous dispersion comprises from 20 to 85 percent by weight of water, based on the weight of the dispersion; for example, the aqueous dispersion comprises from 30 to 75 percent by weight of water, based on the weight of the aqueous dispersion. The aqueous dispersion comprises 15 to 80 percent by total weight of solid content, based on the weight of the aqueous dispersion; for example, from 25 to 70 percent by weight of total solid content, based on the weight of the dispersion; or in the alternative, from 35 to 65 percent by weight of total solid content based on the weight of the aqueous dispersion. The aqueous dispersion has a pH in the range of less than 7; for example, in the range of from less than 6, or in the alternative, in the range of from less than 5, or in the alternative, in the range of from less than 4, or in the alternative, from 1 to 4, or in the alternative from 2 to 4. The aqueous dispersion has a viscosity in the range of from less than 10,000 cP, for example, in the range of from less than 1,000 cP.

The aqueous dispersion has long term shelf stability, for example, the aqueous dispersion remains a stable dispersion for prolonged periods, e.g. at least for 30 days, while remaining suitable for its intended purpose. The aqueous dispersion has acceptable heat stability for routine storage and transportation, for example, the aqueous dispersion is heat stable at 60° C. for a period of 10 days, while remaining suitable for its intended purpose.

The aqueous dispersion comprises from 15 to 85 percent by weight of the polycarbamate component, based on the weight of the dispersion; for example, from 25 to 70 percent by weight of the polycarbamate component, based on the weight of the dispersion; or in the alternative, from 35 to 65 percent by weight of the polycarbamate component, based on the weight of the dispersion. The polycarbamate component comprises a polycarbamate comprising at least an average of 2.0 carbamate functional groups. Unless otherwise noted herein, the term "carbamate functional group" means a radical structure of formula

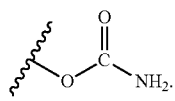

In one embodiment, the polycarbamate is the condensation product of one or more polyols with an unsubstituted carbamic acid alkyl ester or urea. As used herein, the term "polyol" means an organic molecule having at least 2-OH functionalities. In one embodiment, such polyol is an acrylic, styrene-acrylic, styrene-butadiene, ethylenevinylacetate, vinylacetate, vinyl, ester, e.g. polyester, urethane, alkyd, ether or carbonate polymer or oligomer thereof. As used herein, the term "polyester polyol" means a subclass of polyol that is an organic molecule having at least 2 alcohol (—OH) groups (preferably including alpha,omega —OH) and at least one carboxylic ester ($CO_2$—C) functionality. The term "alkyd" means a subclass of polyester polyol that is a fatty acid-modified polyester polyol wherein at least one carboxylic ester functionality is preferably derived from an esterification reaction between an alcoholic —OH of the polyol and a carboxyl of a ($C_8$-$C_{60}$) fatty acid.

In one embodiment, the polycarbamate component can be produced via batch process or continuous process. In one embodiment, one or more polycarbamates, which are optionally dissolved in a solvent, e.g. organic solvent, or in the alternative, melted via heat, and optionally one or more surfactants, and water are fed into a mixer, e.g. an OAKS Mixer or an IKA Mixer, thereby dispersing the one or more polycarbamates into the water, and thereby forming an aqueous polycarbamate dispersion.

In one embodiment, the polycarbamate has carbamate groups and hydroxyl groups in a ratio of the equivalents of carbamate groups to the number of equivalents of hydroxyl functional groups of from 1:9 to 20:1. In another embodiment, the polycarbamate is prepared through free radical emulsion or suspension addition polymerization of one or more α,β-ethylenically unsaturated monomers at least one of which comprises carbamate functionality.

The aqueous dispersion comprises from 0.5 to 15 percent by weight of the polyaldehyde component, based on the weight of the total dispersion solids; for example, from 0.5 to 10 percent by weight of the polyaldehyde component, based on the weight of the dispersion; or in the alternative, from 1 to 5 percent by weight of the polycarbamate component, based on the weight of the total dispersion solids. As used herein, the term "polyaldehyde" means a molecule containing two or more aldehyde groups or their hydrates, or their acetals or hemiacetals, wherein the molecule is capable of reacting with the polycarbamate component. As used herein, the phrase "react together" means creating one or more covalent bonds between two or more molecules, or portions thereof.

The aldehyde group can be written herein as —C(═O)H or —CHO. In another embodiment, the polyaldehyde has from 2 to 20 carbon atoms. In another embodiment, the polyaldehyde has greater than 20 carbon atoms, with the proviso that a polyaldehyde having greater than 20 carbon atoms has at least one aldehyde group for every 30 carbon atoms. In one embodiment, the polyaldehyde is selected from the group consisting of (cis,trans)-1,4-cyclohexanedicarboxyaldehydes, (cis,trans)-1,3-cyclohexanedicarboxyaldehydes, glutaraldeyde, glyoxal, combinations thereof, and/or mixtures thereof. Exemplary polyaldedyes, e.g. glutaraldeyde, are commercially available under the trade name UCARCIDE™ 42 available from The Dow Chemical Company. Other exemplary polyaldedyes, e.g. glyoxal, are commercially available from BASF.

The crosslinkable composition of the present invention is mixed to prepare the ambient temperature curable composition of the present invention. The methods of using the ambient temperature curable composition of the present invention are useful for preparing the crosslinked compositions of the present invention. The crosslinked compositions of the present invention are useful as a coating, adhesive, primer, sealant, caulk, stain or filler. The adhesive, coating, or sealant of the present invention is useful for preparing an article comprising the same.

The crosslinkable compositions of the present invention have a high degree of crosslinking and, one or more other improved properties such as, for example, improved water resistance, improved chemical resistance, improved deterioration resistance to methyl ethyl ketone (MEK) rubs, increased hardness, improved cross-hatch adhesion, or a combination thereof. The only byproduct produced as a result of the curing step is water. As used herein, the term "byproduct" means a substance or molecule that is produced from a reaction as a natural consequence of the intended chemical transformation (e.g., release of a molecule of water in a chemical transformation involving a dehydration). In contrast, the term "side product" means an unintended substance or molecule that is produced from a reaction (e.g., due to a side reaction between two or more molecules of one of the reactants of a reaction employing two or more different reactants or due to decomposition of a reactant or product). These advantages mean that the invention can be employed in low temperature curing commercial applications that heretofore were unattainable by prior art approaches, which produced unsuitably low levels of crosslinking, unacceptable levels of volatile organic compound (VOC) byproducts, or both, and/ or required unsuitably high curing temperatures.

In an alternative embodiment, the instant invention provides a crosslinkable composition, a crosslinked composition, method of producing the same coating layers and adhesives made therefrom, and method of making such articles, in accordance with any of the preceding embodiments, except that the polycarbamate has carbamate groups and hydroxyl groups in a ratio of the equivalents of carbamate groups to the number of equivalents of hydroxyl functional groups of from 1:9 to 20:1.

The aqueous dispersion can be formed by any number of methods recognized by those having skill in the art. Dispersion equipment can be operated in batch, semi-batch, or continuous mode. Examples of mixers include rotor-stator, microfluidizer, high pressure homogenizer, ultrasonic, impinging jet, Cowles™ blade, planetary mixers, and melt kneading devices such as extruders.

A process for producing the dispersions in accordance with the present invention is not particularly limited.

In another embodiment, the aqueous dispersion can be formed in a continuous high shear mixer. In this embodiment, the first stream comprising one or more carbamate are supplied to a continuous high shear mixer from a suitable liquid pump for example, a syringe pump, gear pump, or progressive cavity pump. The first stream is flowed through a first conduit and merged continuously with a second stream containing a continuous aqueous phase that is flowed through a second conduit. The first and second streams are merged into a disperser in the presence of a stabilizing agent, e.g. surfactant, with an optional neutralizing agent. The agents can be added to either the first or second stream, or as a separate stream. A third stream comprising water can be added downstream from the disperser. The flow rates of the streams are adjusted to achieve a dispersion having the desired amount of polymer phase and percent solids. The disperser can be any one of a number of continuous inline mixers, for example, an IKA high-shear mixer, Oakes rotor stator mixer, Ross mixer, Silverson mixer, or centrifugal pump. The rpm setting of the disperser can be used to help control the particle size of the dispersed hydrophobic phase in the dispersion. The system can be heated to provide the polymer and neutralizer components at a suitable viscosity for pumping. In some embodiments, the dispersion is further cooled after exiting the disperser by the use of a suitable heat exchanger.

In another embodiment, the aqueous dispersion can be formed in a batch or semi-batch high shear mixer.

In an alternative embodiment, the instant invention provides a crosslinkable composition, a crosslinked composition, method of producing the same, coating layers and adhesives made therefrom, and method of making such articles, in accordance with any of the preceding embodiments, except that the polycarbamate is prepared through free radical emulsion or suspension addition polymerization product of one or more α,β-ethylenically unsaturated monomers at least one of which comprises carbamate functionality. Alternatively, an polycarbamate can be prepared through free radical polymerization in solvent of one or more α,β-ethylenically unsaturated monomers at least one of which comprises carbamate functionality. The resulting polycarbamate can then be dispersed in water using shear.

Examples of suitable organic solvents are non-polar or polar organic solvents such as, for example, an alkane (e.g., a ($C_6$-$C_{12}$)alkane), ether (e.g., ($C_2$-$C_{12}$)ether, e.g., a ($C_2$-$C_{12}$) dialkyl ether), carboxylic ester (e.g., a ($C_2$-$C_{12}$)carboxylic ester), ketone (e.g., a ($C_3$-$C_{12}$)ketone), secondary or tertiary carboxamide (e.g., a secondary or tertiary ($C_3$-$C_{12}$)carboxamide), sulfoxide (e.g., a ($C_2$-$C_{12}$)sulfoxide), or a mixture of two or more thereof.

In an aspect of the present invention, the latex is an acrylic latex containing structural units of carbamate functional groups. The carbamate functional group can be incorporated using ethylenically unsaturated monomers containing carbamate groups. Examples of such monomers include: 2-Propenic acid, 2-[(aminocarbonyl)oxy]propyl ester; 2-Propenic acid, 2-[(aminocarboxy)oxy]-1-methylethyl ester; 2-Propenic acid, 2-methyl-2-[(aminocarbonyl)oxy]ethyl ester; 2-Propenic acid, 2-[(aminocarbonyl)oxy]propyl ester; or 2-Propenic acid, 2-methyl-2-[(aminocarbonyl)oxy]-1-methylethyl ester.

The emulsion polymer typically includes at least one copolymerized nonionic ethylenically unsaturated monomer not bearing carbamate functionality such as, a (meth)acrylic ester monomer including methyl(meth)acrylate, ethyl(meth)acrylate, butyl(meth)acrylate, 2-ethylhexyl(meth)acrylate, hydroxyethyl(meth)acrylate, and hydroxypropyl(meth) acrylate; ureido-functional(meth)acrylate; acrylonitrile, acrylamide styrene or substituted styrenes; vinyl toluene; butadiene; monoethylenically unsaturated acetophenone or benzophenone derivatives such as, for example are taught in U.S. Pat. No. 5,162,415; vinyl acetate or other vinyl esters, vinyl monomers such as vinyl chloride, vinylidene chloride, and N-vinyl pyrollidone. By "nonionic monomer" herein is meant that the copolymerized monomer residue does not bear an ionic charge between pH 1 to 14. The use of the term "(meth)" followed by another term such as (meth)acrylate, as used throughout the disclosure, refers to both acrylates and methacrylates.

The emulsion polymer may also include at least one copolymerizable ethylenically unsaturated ionic monomer, most notably (meth)acrylic acid, crotonic acid, itaconic acid, fumaric acid, maleic acid, monomethyl itaconate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl(meth)acrylate, phosphoalkyl(meth) acrylates such as phosphoethyl(meth)acrylates, phosphopropyl(meth)acrylates and phosphobutyl(meth) acrylates, phosphoalkyl crotonates, phosphoalkyl maleates, phosphoalkyl fumarates, phosphodialkyl(meth)acrylates, phosphodialkyl crotonates, and allyl phosphates. In one embodiment, the copolymerizable ethylenicically unsaturated monomer is selected from a group including phosphoalkyl(meth)acrylates, such as phosphoethylmethacrylate, and 2-acryl amido-2-methylpropane sulfonic acid.

Furthermore, the acrylic latexes may also include structural units of other monomers capable of imparting co-curable functionality, such as glycidyl(meth)acrylates and acetoacetoxyethyl(meth)acrylates.

In certain embodiments it may be advantageous to incorporate into the polymer copolymerized multi-ethylenically unsaturated monomer groups. Multi-ethylenically unsaturated monomers include, for example, allyl(meth)acrylate, diallyl phthalate, 1,4-butylene glycol di(meth)acrylate, 1,2-ethylene glycol di(meth)acrylate, 1,6-hexanediol di(meth) acrylate, and divinyl benzene. It may be especially advantageous to incorporate such monomer groups non-uniformly into the polymer to form multiphase polymer particles to create a core-shell, hemispherical, or occluded morphology.

It may be advantageous to include chain transfer agents in the latex preparation. Examples of chain transfer agents include, but are not limited to, dodecylmercaptan, butylmercaptopropionate, methylmercaptopropionate, mercaptopropionic acid, etc.

In certain embodiments, it may be beneficial to use multiphase polymer particles such as those disclosed by Duda et al. in *Langmuir* 2005, 21, 1096-1102. The preparation of these morphologies is well known in the art. A multi-stage emulsion polymerization process usually results in the formation of at least two mutually incompatible polymer compositions, thereby resulting in the formation of at least two phases. The mutual incompatibility of two or more polymer compositions and the resultant multiphase structure of the polymer particles may be determined in a variety of ways including scanning electron microscopy using staining techniques to emphasize the difference between the phases.

Multiphase polymer particles may be of various geometries including core/shell or core/sheath particles, core/shell particles with shell phases incompletely encapsulating the core, and core/shell particles with a multiplicity of cores. The final properties of these latexes are often achieved by balancing the monomer compositions of the individual phases and their relative proportions. For the present invention, it may be advantageous to use disparate or similar Tgs, and similar or disparate hydrophobicities. The end use application of the latex usually dictates the properties of each polymer phase.

The morphology of the host latex is not limited to strictly organic materials. It may be advantageous to make use of polymers that have embedded or adsorbed inorganic phases or domain, for example, polymer-encapsulated opacifying pigment particles comprising i) opacifying pigment particles having a diameter in the range of 100 nm to 500 nm and an index of refraction from 1.8 to 4.5; ii) an encapsulating polymer that contains polymerized units of a sulfur acid monomer, or a salt thereof, and iii) a polymeric dispersant for the encapsulated opacifying pigment particles and the polymer, which dispersant contains sulfur acid groups, or salts thereof, and amine groups, as described, for example, in U.S. Patent Publication US 2010/0298483 A1. In an alternative embodiment, the instant invention provides a crosslinkable composition, a crosslinked composition, method of producing the same, coating layers and adhesives made therefrom, and method of making such articles, in accordance with any of the preceding embodiments, except that the polyaldehyde has from 2 to 20 carbon atoms.

The aqueous dispersion comprises from 0.5 to 15 percent by weight of the polyaldehyde component, based on the weight of the total dispersion solids; for example, from 0.5 to 10 percent by weight of the polyaldehyde component, based on the weight of the dispersion; or in the alternative, from 1 to 5 percent by weight of the polycarbamate component, based on the weight of the total dispersion solids. As used herein, the term "polyaldehyde" means a molecule containing two or more aldehyde groups or their hydrates, or their acetals or hemiacetals, wherein the molecule is capable of reacting with the polycarbamate component. As used herein, the phrase "react together" means creating one or more covalent bonds between two or more molecules, or portions thereof.

The aldehyde group can be written herein as —C($=$O)H or —CHO. The polyaldehyde component of the present invention may have two or more aldehyde groups. The polyaldehyde can be a cyclic, straight or branched; cyclic and nonaromatic; cyclic and aromatic (e.g., 3-formylbenzaldehyde), or a combination thereof.

In another embodiment, the polyaldehyde has from 2 to 20 carbon atoms. In another embodiment, the polyaldehyde has greater than 20 carbon atoms, with the proviso that a polyaldehyde having greater than 20 carbon atoms has at least one aldehyde group for every 30 carbon atoms.

In one embodiment, the polyaldehyde is selected from the group consisting of (cis,trans)-1,4-cyclohexanedicarboxyaldehydes, (cis,trans)-1,3-cyclohexanedicarboxyaldehydes, glutaraldeyde, glyoxal, combinations thereof, and/or mixtures thereof. Exemplary polyaldedyes, e.g. glutaraldeyde, are commercially available under the trade name UCARCIDE™ 42 available from The Dow Chemical Company. Other exemplary polyaldedyes, e.g. glyoxal, are commercially available from BASF.

The polyaldehyde of the present invention is substantially formaldehyde free. As used herein, the term "substantially formaldehyde free" means that the multicomponent composition or ambient temperature curable composition comprises less than 500 ppm of free formaldehyde, based on the total weight of polyaldehyde solids, preferably, less than 300 ppm, or, more preferably, less than 200 ppm. The compositions of the present invention contain so little of resins made from formaldehyde, such as aminoplasts and phenol or resole formaldehyde condensates, that the amount of free formaldehyde in such compositions meets the definition of "substantially formaldehyde free".

In an alternative embodiment, the instant invention provides a crosslinkable composition, a crosslinked composition, method of producing the same, coating layers and adhesives made therefrom, and method of making such articles, in accordance with any of the preceding embodiments, except that the acid catalyst has a pKa of less than 6.0.

In an alternative embodiment, the instant invention provides a crosslinkable composition, a crosslinked composition, method of producing the same, coating layers and adhesives made therefrom, and method of making such articles, in accordance with any of the preceding embodiments, except that the acid catalyst has a pKa of less than 4.0

In an alternative embodiment, the instant invention provides a crosslinkable composition, a crosslinked composition, method of producing the same, coating layers and adhesives made therefrom, and method of making such articles, in accordance with any of the preceding embodiments, except that the acid catalyst is Lewis acid.

Any compound, substance or material suitable for increasing a rate of reaction of a carbamate group (—O—C($=$O)—NH$_2$) with an aldehyde group (—C($=$O)H) can be employed as the acid catalyst, i.e. triggering agent. Examples of acid catalyst, i.e. triggering agents are Lewis acids (e.g., boron trifluoride etherate) and protic acids (i.e., Brønsted acids). Preferably, the acid catalyst, i.e. triggering agent comprises a protic acid characterizable as having a pK$_a$ of 6 or lower, wherein pK$_a$ is negative base-10 logarithm of acid dissociation constant, K$_a$, of the protic acid. Thus, the ambient temperature curable composition of the present invention has a pH of 7.0, or less, preferably, from pH 3 to pH<6. A preferred protic acid is an inorganic protic acid or organic protic acid. A preferred inorganic protic acid is phosphoric acid or sulfuric acid. A preferred organic protic acid is carboxylic acid, phosphonic acid, or sulfonic acid. A preferred carboxylic acid is acetic acid, trifluoroacetic acid, propionic acid, or a dicarboxylic acid. A preferred phosphonic acid is methylphosphonic acid. A preferred sulfonic acid is methanesulfonic acid, benzenesulfonic acid, a camphorsulfonic acid; para-toluenesulfonic acid, or dodecylbenzenesulfonic acid. Examples of suitable Lewis acid curing catalysts are AlCl$_3$; benzyltriethylammonium chloride (TEBAC); Cu(O$_3$SCF$_3$)$_2$; (CH$_3$)$_2$BrS$^+$ Br$^-$; FeCl$_3$ (e.g., FeCl$_3$.6H$_2$O); HBF$_4$; BF$_3$.O(CH$_2$CH$_3$)$_2$; TiCl$_4$;SnCl$_4$; CrCl$_2$; NiCl$_2$; and Pd(OC(O)CH$_3$)$_2$.

The acid catalyst, i.e. triggering agent can be unsupported (no solid support) or supported, i.e. covalently bonded to a solid support. Examples of supported triggering agents are supported curing catalysts such as supported acid catalysts such as acid (H$^+$) forms of cation exchange-type polymer resins (e.g., ethanesulfonic acid, 2-[1-[difluoro[(1,2,2-trifluoroethenyl)oxy]methyl]-1,2,2,2-tetrafluoroethoxy]-1,1,2, 2-tetrafluoro-, polymer with 1,1,2,2-tetrafluoroethene sold under trade name NAFION NR 50 (E. I. du Pont de Nemours & Co., Inc., Wilmington, Del.) and ethenylbenzenesulfonic acid polymer with diethenylbenzene sold as AMBERLYST™ 15 (Rohm and Haas Co., subsidiary of The Dow Chemical Company, Midland, Mich., USA.).

In an alternative embodiment, the instant invention provides a crosslinkable composition, a crosslinked composition, method of producing the same, in accordance with any of the preceding embodiments, except that the acid catalyst is a functional group which is incorporated into the backbone of the polycarbamate.

In an alternative embodiment, the instant invention provides a crosslinkable composition, a crosslinked composition, method of producing the same, coating layers and adhesives made therefrom, and method of making such articles, in accordance with any of the preceding embodiments, except that the composition further comprises a curing inhibitor. Curing inhibitors may include, for example, alcohols, water, or mixtures thereof. In one embodiment, the alcohol is present at a concentration of from 0.5 wt % to 50 wt %, based on the total weight of solids in the composition, or more preferably, at most 20 wt %, and, still more preferably, at most 10 wt %. Preferably, water is present at a concentration of from 20% wt % to 70 wt %, based on the total weight of solids in the composition, or more preferably, from 30 wt % to 60 wt %.

In an alternative embodiment, the instant invention provides a crosslinkable composition, a crosslinked composition, method of producing the same, coating layers and adhesives made therefrom, and method of making such articles, in accordance with any of the preceding embodiments, except that the alcohol is selected from the group consisting of ethanol, 1-propanol, 1-butanol, 1-pentanol, Ethylene glycol monoalkyl ethers, diethylene glycol monoalkyl ethers, propylene glycol monoalkyl ethers and dipropylene glycol monoalkyl ethers, 2,2,4-Trimethyl-1,3-pentanediol monoisobutyrate, combinations thereof, and mixture thereof.

The crosslinkable aqueous composition of the invention may contain in addition to water, a polycarbamate comprising at least an average of 2.0 carbamate functional groups, a polyaldehyde comprising at least two aldehyde groups, and an acid catalyst; additional film forming or non film forming polymers, extenders, emulsifiers, coalescing agents, plasticizers, antifreezes, curing agents, buffers, neutralizers, thickeners, rheology modifiers, humectants, wetting agents, biocides, anti-foaming agents, UV absorbers, fluorescent brighteners, light or heat stabilizers, chelating agents, dispersants, tackifiers, colorants, waxes, water-repellants and pigments. Exemplary pigments include $TiO_2$, lamp black, talc, calcium carbonate, or clay.

Preferably in the present invention, the curing temperature of the ambient temperature curable composition is 80° C. or lower, more preferably 60° C. or lower, still more preferably 40° C. or lower, and even more preferably 30° C. or lower. A preferred minimum effective curing temperature is a minimum temperature effective for curing the invention ambient temperature curable composition to yield the invention crosslinked composition within 7 days. The curing step of the invention process employing the invention ambient temperature curable composition remarkably can be performed at ambient temperature (i.e., 60° C. or lower). In some embodiments the ambient temperature for curing is at least 0° C., in some embodiments at least 10° C., and in some embodiments at least 20° C. In some embodiments the ambient temperature for curing is 50° C. or less, in some embodiments 40° C. or less, in some embodiments 35° C. or less, and in some embodiments 30° C. or less. A preferred ambient temperature for curing is from 19° C. to 29° C.

Preferably a crosslinked composition prepared according to the present invention forms a coating or adhesive that exhibits good to excellent cross-hatch adhesion, water resistance, chemical resistance, resistance to rubbing with methyl ethyl ketone, high pendulum hardness, or a combination of any two or more thereof.

The crosslinked coating compositions of the present invention, even those produced by curing at room temperature, have a high degree of crosslinking. This high degree of crosslinking preferably is evidenced by a spectral property (e.g., obtained from proton-nuclear magnetic resonance ($^1$H-NMR) spectroscopy, $^{13}$C-NMR spectroscopy, or FT-IR spectroscopy) or, more preferably, by one or more improved performance properties. Preferably at least one of the improved performance properties is cross-hatch adhesion, water resistance, deterioration resistance to methyl ethyl ketone rubs, or high pendulum hardness.

Preferably, methods of using the crosslinked compositions of the present invention comprise coatings formed with the crosslinkable coating compositions, wherein the coating exhibits a water resistance, resistance to rubbing with methyl ethyl ketone, high pendulum hardness, cross-hatch adhesion, or a combination of any two or more thereof.

An adhesive composition of the present invention may comprise the invention crosslinked coating compositions, which is disposed between and in independent operative contact with at least a portion of each of two substrates capable of being adhered to each other.

The coating composition of the present invention comprises a layer of the invention crosslinked coating compositions, which is in coating operative contact to at least a portion of a substrate capable of being coated.

The crosslinked composition of the present invention may comprise a sealant, which is disposed in sealing operative contact to a substrate capable of being sealed. Preferably the invention sealant prevents or inhibits passage of a liquid or gas, dust or smoke; more preferably a liquid or gas; still more preferably a liquid, and even more preferably water. In some embodiments the sealant further comprises an inert filler material (e.g., inert finely-divided powder). In methods of using the sealants of the present invention, sealed substrates can be prepared by any suitable method. For example, a method of sealing a substrate comprises contacting the invention ambient temperature curable composition to at least a portion of the substrate to yield a composite material comprising a curable coating of the ambient temperature curable composition in operative contact with at least the portion of the substrate; and curing the curable coating of the ambient temperature curable composition of the composite material at a curing temperature of from 0° C. to less than 80° C. so as to prepare a sealed substrate comprising a sealant layer of the invention crosslinked composition in sealing operative contact to at least the portion of the substrate. For example, the curable composition may be cured at a curing temperature of 30° C. or less.

The invention coated substrate can be prepared by any suitable method. For example, in a method of coating a surface of a substrate, the method comprises applying invention ambient temperature curable composition to at least a portion of the surface of the substrate and curing the curable coating of the ambient temperature curable composition of the composite material at a curing temperature of 80° C. or less, or, for example, 30° C. or less, so as to prepare a coated substrate comprising a crosslinked polyurethane.

The invention ambient temperature curable composition can be applied to the surface of the substrate(s) by any suitable applying means such as, for example, brushing, calendaring, rolling, spraying, mopping, troweling, or dipping. The substrate being coated, adhered to, or sealed can be of any shape including, for example, a flat or rolled sheet (e.g., cylinder), sphere, beads, finely divided particles, and the like. The surface of the substrate being coated, adhered to, or sealed can be irregular or regular, continuous or discontinuous, porous or non-porous, jointed or not jointed.

The substrates suitable for being adhered to, coated, or sealed independently can comprise any material. Examples of suitable material are wood, metal, ceramic, plastic, concrete, asphalt, hair, paper, leather, rubber, glass, foam and/or textiles.

EXAMPLES

The following examples illustrate the present invention but are not intended to limit the scope of the invention.

Formulation Components:

| | |
|---|---|
| Butyl acrylate | BA |
| 2-Ethylhexyl acrylate | EHA |
| Methyl methacrylate | MMA |
| Methyl ethyl ketone | MEK |
| Isopropyl alcohol | IPA |
| Phosphoethylmethacrylate | PEM |
| Hydroxypropyl carbamate acrylate, 70% in Ethanol | HPCA |
| n-Dodecylmercaptan | nDDM |
| t-Butylhydroperoxide, 70% | tBHP |
| Isoascorbic Acid | IAA |
| Sodium persulfate, 99% | NaPS |
| Ammonium persulfate, 99% | APS |
| Alkylpolyethoxysulfate, Na salt (31%) | Surfactant A |
| 2-acrylamide-2-methylpropane sulfonic acid | AMPS |
| Ethyelendiaminetetraacetic acid | EDTA |

Polycarbamate Component 1

Polycarbamate component 1 is an emulsion polymer (MMA/BA/HPCA Latex) prepared according to the following process.

A monomer emulsion was prepared by mixing deionized water (155 g), Surfactant A (24.3 g), BA (321.6 g), MMA (382.4 g), HPCA (114.3 g), AMPS (16 g), and n-DDM (6 g) in a first vessel. A reactor flask was charged with deionized water (675 g) and Surfactant A (5 g), and then the temperature of the mixture was increased to approximately 82° C. under a $N_2$ purge. The reactor flask was charged with a 35.6 g of the monomer emulsion followed by a 30 g of deionized water rinse. A solution of NaPS (3.2 g) in deionized water (40 g) was added to the reactor flask followed by a deionized water rinse (20 g). After a peak exotherm, the monomer emulsion was fed to the reactor flask at a rate of 7.5 g/min for 10 minutes, and then increased to 15.2 g/min for an additional 60 min, while maintaining a reactor flask temperature of approximately 80° C. Subsequently, the monomer emulsion line was rinsed with deionized water (45 g) and the reactor flask was maintained at approximately 80° C. for 10 minutes before being cooled to 65° C. At 65° C., a solution containing 0.15 weight percent aqueous iron sulfate heptahydrate (3.5 g) and 1.0 weight percent aqueous solution of EDTA (0.5 g) was added followed by the addition of separate solutions of t-BHP (0.40 g in 10 g of deionized water) and IAA (0.15 g in 10 g of deionized water). The reactor flask was maintained at approximately 65° C. for 15 minutes before separate solutions of t-BHP (0.40 g in 10 g of deionized water) and IAA (0.15 g in 10 g of deionized water) were added to the reactor flask. After 15 minutes at 65° C., the content of the reactor was cooled to 30° C. The emulsion polymer (polycarbamate component 1) was filtered via 100 mesh screen, and characterized for its solids, pH, and particle size. The results are reported in Table 1.

TABLE 1

| | Polycarbamate component 1 |
|---|---|
| DI water (g) | 155 |
| Surfactant A (g) | 24.3 |
| BA (g) | 321.6 |
| MMA (g) | 382.4 |
| HPCA (g) | 114.3 |
| n-DDM (g) | 6 |
| AMPS (g) | 16 |
| Particle size (nm) | 123 |
| Latex solids (%) | 43.1 |
| pH | 1.3 |

Polycarbamate Component 2

Polycarbamate component 2 is an emulsion polymer (MMA/Sty/HPCA/2-EHA Latex) prepared according to the following process.

A monomer emulsion was prepared by mixing deionized water (428 g), Surfactant A (39.9 g), STY, (316 g), PEM (50.4 g), MMA (396.8 g), HPCA (225.6 g) and 2-EHA (646.4 g) in a first vessel. A reactor flask was charged with deionized water (708 g) and Surfactant A (2.2 g), and then the temperature of the mixture was increased to approximately 82° C. under a $N_2$ purge. The reactor flask was charged with a 61.4 g of the monomer emulsion followed by a deionized water rinse (20 g). n-DDM (7.8 g) and deionized water (10 g) was then added to the monomer emulsion. The reaction flask was then charged with a solution of APS (5.8 g in 19.8 g of deionized water). After a peak exotherm, the monomer emulsion was fed to the reactor at a rate of 6.9 g/minutes for 10 minutes, and then increased to 14.2 g/minutes for an additional 140 minutes, maintaining a reactor temperature of approximately 80 to 81° C. A solution of APS (3.1 g) in deionized water (87.8 g) was added to the reactor flask concurrently with the monomer emulsion feed at a rate of 0.30 g/minutes for the first 20 minutes, and then increased to a rate of 0.62 g/minutes for an additional 140 minutes. Deionized water (390 g) was co-fed to reactor for approximately 140 minutes. Subsequently, the monomer emulsion line was rinsed with deionized water (50 g) and the reactor flask was maintained at approximately 80 to 81° C. for 30 minutes before being cooled to 65° C. At 65° C., a solution containing 0.15 weight percent aqueous iron sulfate heptahydrate (13.8 g) and 1.0 weight percent aqueous solution of EDTA (2.1 g) was added followed by separate solutions of t-BHP (1.5 g in 18.6 g of deionized water) and IAA (0.7 g in 19 g of deionized water) were co-fed separately over 30 minutes. MMA (3.0 g) is added to the reactor flask followed by the addition of deionized water (3.3 g) 10 minutes after co-feeds were completed. Immediately thereafter, separate solutions of t-BHP (0.8 g in 6.6 g of deionized water) and IAA (0.6 g in 16.8 g of deionized water) were added to the reactor flask. The reactor was then cooled to 30° C. The emulsion polymer, polycarbamate component 2, was filtered via 100 mesh screen and characterized for its solids, pH, and particle size. The results are reported in Table 2.

TABLE 2

| | Polycarbamate component 2 |
|---|---|
| DI water (g) | 428 |
| Surfactant A (g) | 39.9 |
| Sty (g) | 316 |
| PEM (g) | 50.4 |
| MMA (g) | 396.8 |
| HPCA (g) | 225.6 |
| 2-EHA | 646.4 |
| n-DDM | 7.8 |
| ME seed (g) | 61.4 |
| $H_2O$ cofeed (g) | 390 |
| Particle size (nm) | 142 |
| Latex solids (%) | 44.8 |
| pH | 1.3 |

Polycarbamate Component 3

Polycarbamate component 3 is an emulsion polymer (MMA/Sty/HPCA/2-EHA Latex) prepared according to the following process.

A monomer emulsion was prepared by mixing deionized water (428 g), Surfactant A (39.9 g), STY, (316 g), PEM (50.4 g), MMA (565.6 g), HPCA (225.6 g) and 2-EHA (477.8 g) in a first vessel. A reactor flask was charged with deionized water (708 g) and Surfactant A (2.2 g), and then the temperature of the mixture was increased to approximately 82° C. under a $N_2$ purge. The reactor flask was charged with a 61.4 g of the monomer emulsion followed by a deionized water rinse (20 g). n-DDM (7.8 g) and deionized water (10 g) was then added to the monomer emulsion. The reaction flask was then charged with a solution of APS (5.8 g in 19.8 g of deionized water). After a peak exotherm, the monomer emulsion was fed to the reactor at a rate of 6.9 g/minutes for 10 minutes, and then increased to 14.2 g/minutes for an additional 140 minutes, maintaining a reactor temperature of approximately 80 to 81° C. A solution of APS (3.1 g) in deionized water (87.8 g) was added to the reactor flask concurrently with the monomer emulsion feed at a rate of 0.30 g/minutes for the first 20 minutes, and then increased to a rate of 0.62 g/minutes for an additional 140 minutes. Deionized water (390 g) was co-fed to reactor for approximately 140 minutes. Subsequently, the monomer emulsion line was rinsed with deionized water (50 g) and the reactor flask was maintained at approximately 80 to 81° C. for 30 minutes before being cooled to 65° C. At 65° C., a solution containing 0.15 weight percent aqueous iron sulfate heptahydrate (13.8 g) and 1.0 weight percent aqueous solution of EDTA (2.1 g) was added followed by separate solutions of t-BHP (1.5 g in 18.6 g of deionized water) and IAA (0.7 g in 19 g of deionized water) were co-fed separately over 30 minutes. MMA (3.0 g) is added to the reactor flask followed by the addition of deionized water (3.3 g) 10 min after co-feeds were completed. Immediately thereafter, separate solutions of t-BHP (0.8 g in 6.6 g of deionized water) and IAA (0.6 g in 16.8 g of deionized water) were added to the reactor flask. The reactor was then cooled to 30° C. The emulsion polymer, polycarbamate component 3, was filtered via 100 mesh screen and characterized for its solids, pH, and particle size. The results are reported in Table 3.

TABLE 3

|  | Polycarbamate component 3 |
| --- | --- |
| DI water (g) | 428 |
| Surfactant A (g) | 39.9 |
| Sty (g) | 316 |
| PEM (g) | 50.4 |
| MMA (g) | 565.6 |
| HPCA (g) | 225.6 |
| 2-EHA | 477.8 |
| n-DDM | 7.8 |
| ME seed (g) | 61.4 |
| $H_2O$ cofeed (g) | 390 |
| Particle size (nm) | 137 |
| Latex solids (%) | 44.9 |
| pH | 1.3 |

Polycarbamate Component 4

Polycarbamate component 4 is a solvent diluted acrylic polymer made from the reaction of a commercial acrylic polyol, PARALOID™ AU-608x, commercially available from The Dow Chemical Company, with methyl carbamate and diluted with xylene.

Into a reactor system comprising a 3 necked 2000 mL round bottom flask equipped with a mechanical stirrer, Dean-Stark trap, condenser, and nitrogen bubbler system was place PARALOID™ AU-608x acrylic polyol (1500 g, 1.334 moles hydroxyl), methyl carbamate (100.2 g, 1.334 mole) and dibutyltin oxide catalyst (4.8 g, 0.30%). The system was flushed with nitrogen gas, the reaction contents were heated to lower the viscosity, and stirring was initiated. Once the methyl carbamate dissolved, the resulting reaction mixture was slowly heated to 140° C. and held at this temperature. The methanol produced was collected and the volume of this byproduct was recorded. Once the methanol was no longer being significantly generated, nitrogen was flushed over the liquid contents to drive the remaining methanol and excess methyl carbamate from the reaction mixture. For a typical reaction cycle, the heating at 140° C. was performed for 8 hours on a first day, the heating was stopped (heat source is turned off), and then on a second day the heating at 140° C. was continued for another 8 hours with nitrogen gas passing over the reaction mixture. Carbon-13 nuclear magnetic resonance ($^{13}$C-NMR) in perdeuterated dimethyl sulfoxide (d6-DMSO) analysis shows that the methyl carbamate was removed by observation of the methyl carbon resonance. During the removal of methanol and unreacted methyl carbamate, if the viscosity of the resulting mixture was too high such that the product would be slow to pour, then mixed xylenes were added to the reaction mixture to lower the viscosity so that the product was satisfactorily pourable. A hydroxyl number titration showed 9 mg KOH/g and acid titration indicated 4.5 mg KOH/g which validated conversion of hydroxyl groups to carbamate groups. On completion, the polyacrylic-based polycarbamate of polycarbamate component 4 was a clear liquid solution. A TGA analysis showed a weight percent solids of 62 wt. %. The carbamate content of the polyacrylic-based polycarbamate was determined by subtracting the hydroxyl content thereof polycarbamate component 4 from the hydroxyl content of the starting PARALOID™ AU-608X acrylic polyol. The equivalent weight was calculated as Ew=1431.3 g eq/mol (@62% solids).

CHDA (Aldehyde component) is approximately a 1:1 1,3 cyclohexanedicarboxaldehyde and 1,4-cyclohexanedicarboxaldehyde, having a weight average molecular weight ($M_w$) of 140.1 g/mol, and an equivalent weight (EW) of 70.05 equi g/mol.

Acid Catalyst 1 comprises: 25% p-toluenesulfonic acid (PTSA) solution; 1 g PTSA; and 3 g MEK (methyl ethyl ketone).

Steel Substrate comprised a steel metal sheet (Act Test Panels) having the following dimensions: Cold Roll Steel 4 in.×12 in.×0.032 in. and polished and clean.

The coating compositions were applied to the steel substrate using a doctor blade having a gap of 5 mil.

Wood Substrate comprised a Poplar board ¼ in.×4 in.×48 in. (purchased from Home Depot) that was cut down 5 in. lengths (5 in.×4 in.×¼ in.). They were coated three times with the formulation by using a foam brush. After each coat, the coating was allowed to dry for 1 day and then lightly sanded before the addition of the next coat. The last coat, the third coat, was not sanded.

Comparative Emulsion Polymer 1

Comparative emulsion polymer 1 is (MMA/Sty/2-EHA Latex) prepared according to the following process.

A monomer emulsion was prepared by mixing deionized water (408 g), Surfactant A (39.9 g), STY, (294.4 g), PEM (47.2 g), MMA (476 g), and 2-EHA (639 g) in a first vessel. A reactor flask was charged with deionized water (708 g) and Surfactant A (2.2 g), and then the temperature of the mixture was increased to approximately 82° C. under a $N_2$ purge. The reactor flask was charged with a 59.5 g of the monomer emulsion followed by a deionized water rinse (20 g). n-DDM (7.4 g) and deionized water (10 g) was then added to the monomer emulsion. The reaction flask was then charged with a solution of APS (5.8 g in 19.8 g of deionized water). After a peak exotherm, the monomer emulsion was fed to the reactor at a rate of 6.9 g/minutes for 10 minutes, and then increased to 14.2 g/minutes for an additional 140 minutes, maintaining a reactor temperature of approximately 80 to 81° C. A solution of APS (3.1 g) in deionized water (87.8 g) was added to the reactor flask concurrently with the monomer emulsion feed at a rate of 0.30 g/minutes for the first 20 minutes, and then increased to a rate of 0.62 g/minutes for an additional 140 minutes. Deionized water (390 g) was co-fed to reactor for approximately 140 minutes. Subsequently, the monomer emulsion line was rinsed with deionized water (50 g) and the reactor flask was maintained at approximately 80 to 81° C. for 30 minutes before being cooled to 65° C. At 65° C., a solution containing 0.15 weight percent aqueous iron sulfate heptahydrate (13.8 g) and 1.0 weight percent aqueous solution of EDTA (2.1 g) was added followed by separate solutions of t-BHP (1.5 g in 18.6 g of deionized water) and IAA (0.7 g in 19 g of deionized water) were co-fed separately over 30 minutes. MMA (3.0 g) is added to the reactor flask followed by the addition of deionized water (3.3 g) 10 min after co-feeds were completed. Immediately thereafter, separate solutions of t-BHP (0.8 g in 6.6 g of deionized water) and IAA (0.6 g in 16.8 g of deionized water) were added to the reactor flask. The reactor was then cooled to 30° C. The emulsion polymer, comparative emulsion polymer 1, was filtered via 100 mesh screen and characterized for its solids, pH, and particle size. The results are reported in Table 4.

TABLE 4

| | Comparative Emulsion Polymer 1 |
|---|---|
| DI water (g) | 408 |
| Surfactant A (g) | 39.9 |
| Sty (g) | 294.4 |
| PEM (g) | 47.2 |
| MMA (g) | 476 |
| HPCA (g) | 0 |
| 2-EHA | 639 |
| n-DDM | 7.4 |
| ME seed (g) | 59.5 |
| H$_2$O cofeed (g) | 490 |
| Particle size (nm) | 119 |
| Latex solids (%) | 45.4 |
| pH | 1.3 |

Comparative Emulsion Polymer 2

Comparative emulsion polymer 2 is (MMA/Sty/2-EHA Latex) prepared according to the following process.

A monomer emulsion was prepared by mixing deionized water (408 g), Surfactant A (39.9 g), STY, (294.4 g), PEM (47.2 g), MMA (639 g), and 2-EHA (476 g) in a first vessel. A reactor flask was charged with deionized water (708 g) and Surfactant A (2.2 g), and then the temperature of the mixture was increased to approximately 82° C. under a N$_2$ purge. The reactor flask was charged with a 59.5 g of the monomer emulsion followed by a deionized water rinse (20 g). n-DDM (7.4 g) and deionized water (10 g) was then added to the monomer emulsion. The reaction flask was then charged with a solution of APS (5.8 g in 19.8 g of deionized water). After a peak exotherm, the monomer emulsion was fed to the reactor at a rate of 6.9 g/minutes for 10 minutes, and then increased to 14.2 g/minutes for an additional 140 minutes, maintaining a reactor temperature of approximately 80 to 81° C. A solution of APS (3.1 g) in deionized water (87.8 g) was added to the reactor flask concurrently with the monomer emulsion feed at a rate of 0.30 g/minutes for the first 20 minutes, and then increased to a rate of 0.62 g/minutes for an additional 140 minutes. Deionized water (390 g) was co-fed to reactor for approximately 140 minutes. Subsequently, the monomer emulsion line was rinsed with deionized water (50 g) and the reactor flask was maintained at approximately 80 to 81° C. for 30 minutes before being cooled to 65° C. At 65° C., a solution containing 0.15 weight percent aqueous iron sulfate heptahydrate (13.8 g) and 1.0 weight percent aqueous solution of EDTA (2.1 g) was added followed by separate solutions of t-BHP (1.5 g in 18.6 g of deionized water) and IAA (0.7 g in 19 g of deionized water) were co-fed separately over 30 minutes. MMA (3.0 g) is added to the reactor flask followed by the addition of deionized water (3.3 g) 10 minutes after co-feeds were complete. Immediately thereafter, separate solutions of t-BHP (0.8 g in 6.6 g of deionized water) and IAA (0.6 g in 16.8 g of deionized water) were added to the reactor flask. The reactor was then cooled to 30° C. The emulsion polymer, comparative emulsion polymer 2, was filtered via 100 mesh screen and characterized for its solids, pH, and particle size. The results are reported in Table 5.

TABLE 5

| | Comparative Emulsion Polymer 2 |
|---|---|
| DI water (g) | 408 |
| Surfactant A (g) | 39.9 |
| Sty (g) | 294.4 |
| PEM (g) | 47.2 |
| MMA (g) | 639.0 |
| HPCA (g) | 0 |
| 2-EHA | 476 |
| n-DDM | 7.4 |
| ME seed (g) | 59.2 |
| H$_2$O cofeed (g) | 490 |
| Particle size (nm) | 121 |
| Latex solids (%) | 45.7 |
| pH | 1.3 |

Process for Preparing Inventive Formulations 1-2 and Comparative Formulations A-B:

All formulations were made by adding ingredients dropwise to the binder, i.e. emulsion polymer, while stirring with an overhead mixer. Surfactant was added first, if applicable. Neutralizer was added second, if applicable. If CHDA was added to the formulation, it was first mixed with a coalescent agent, and the CHDA/coalescent mixture was added next. If glutaraldehyde was added, the coalescent agent was added first, followed by the aldehyde. A wetting agent, i.e. Byk 346, was added next, if applicable. Rheology modifier was added last, if applicable. This process was generally done over two to ten minutes depending on the number of ingredients added. All formulations were allowed to sit for an hour before being used to make coatings.

Inventive Formulation 1

Inventive formulation 1 was prepared according to the above process, which is further defined below, based on the formulation components reported in Table 6. 0.87 grams of CHDA was dissolved in 2.16 grams of Proglyde DMM to form a premix. This premix was added dropwise to 50 grams of polycarbamate component 1 while stirring with an overhead mixer, followed by the dropwise addition of 0.20 grams of Byk 346.

Inventive Formulation 2

Inventive formulation 2 was prepared according to the above process, which is further defined below, based on the formulation components reported in Table 6.

2.16 grams of Proglyde DMM was added dropwise to 50 grams of polycarbamate component 1 while stirring with an overhead mixer, followed by the dropwise addition of 1.25 g of 50% glutaraldehyde, and then followed by the dropwise addition 0.20 grams of Byk 346.

Comparative Formulation A

Comparative formulation A was prepared according to the above process, which is further defined below, based on the formulation components reported in Table 6.

2.16 grams of Proglyde DMM was added dropwise to 50 grams of polycarbamate component 1 while stirring with an overhead mixer, followed by the dropwise addition 0.20 grams of Byk 346.

Comparative Formulation B

Comparative formulation B was prepared according to the above process, which is further defined below, based on the formulation components reported in Table 6.

2.4 grams of a 10% solution of dimethylaminoethanol (DMAE) in water was added dropwise to 50 grams of polycarbamate component 1 while stirring with an overhead mixer. 0.87 grams of CHDA ws dissolved in 2.16 grams of Proglyde DMM to form a premix. This premix was added dropwise to the neutralized polycarbamate component 1 while stirring with an overhead mixer, followed by the dropwise addition of 0.20 grams of Byk 346.

TABLE 6

| | Inventive Formulation 1 | Inventive Formulation 2 | Comparative Formulation A | Comparative Formulation B |
|---|---|---|---|---|
| Polycarbamate Component 1 | 50 | 50 | 50 | 50 |
| Triton X-405 | 0 | 0 | 0 | 0 |
| 10% DMAE | 0 | 0 | 0 | 2.4 |
| DMM | 2.16 | 2.16 | 2.16 | 2.16 |
| CHDA | 0.87 | 0 | 0 | 0.87 |
| Glutaraldehyde, 50% in water | 0 | 1.25 | 0 | 0 |
| Byk 346 | 0.20 | 0.20 | 0.20 | 0.20 |
| Final Formulation pH | 1.3 | 1.3 | 1.3 | 7.0 |

Evaluation of Coatings Derived from Inventive Formulations 1-2 and Comparative Formulations A-B Films of approximately 1 mil dry film thickness were made from Inventive Formulations 1-2 and Comparative Formulations A and B approximately four hours after the formulations were made. Inventive Formulation 1 was subsequently aged for three weeks at room temperature, and one additional week at 60° C. and then was used to make a new 1 mil thick dry film. The films were dried under ambient conditions (25° C.) for two weeks before evaluating properties. Koenig (pendulum) hardness was measured according to ASTM D-4366 using a TQC SP0500 Pendulum Hardness Tester, and was reported in seconds in Table 7. Chemical resistance tests were done by placing a 23 mm diameter Whatman filter paper on the coating and saturating it with the chemical, reported in Table 7. The chemical was covered to prevent evaporation for one hour. The chemical and filter paper were removed from the coating by hand and with a mild water rinse. Chemical resistance was ranked 1-5 with 5 representing no visible sign of damage and no noticeable softening of the film, and 1 representing complete dissolution of the coating by the chemical. Chemical resistance was tested for acetone, isopropyl alcohol and a 50/50 mix of ethanol and water.

TABLE 7

| Film From | Konig Hardness (s) | 50% Ethanol Resistance | Isopropyl Alcohol Resistance | Acetone Resistance |
|---|---|---|---|---|
| Inventive Formulation 1 | 50.4 | 4 | 5 | 5 |
| Inventive Formulation 2 | 37.8 | 3 | 5 | 5 |
| Comparative Formulation A | 29.6 | 2 | 1 | 1 |
| Comparative Formulation B | 31.1 | 2 | 1 | 1 |
| Inventive Formulation 1 After Aging | 51.8 | 4 | 5 | 5 |

Inventive Formulation 3

Inventive formulation 3 was prepared according to the above process, which is further defined below, based on the formulation components reported in Table 8. 1.21 grams of CHDA was dissolved in 3.0 grams of Proglyde DMM to form a premix. 0.75 grams of Triton X-405 was added dropwise to 67.0 grams of polycarbamate component 2 while stirring with an overhead mixer, followed by the dropwise addition of CHDA/Proglyde DMM premix, followed by the dropwise addition of 0.20 grams of Byk 346.

Comparative Formulation C

Comparative formulation C was prepared according to the above process, which is further defined below, based on the formulation components reported in Table 8. 0.75 grams of Triton X-405 was added dropwise to 67.0 grams of polycarbamate component 2 while stirring with an overhead mixer, followed by the dropwise addition of 3.0 grams of Proglyde DMM, followed by the dropwise addition of 0.20 grams of Byk 346.

Comparative Formulation D

Comparative formulation D was prepared according to the above process, which is further defined below, based on the formulation components reported in Table 8. 1.35 grams of CHDA were dissolved in 3.0 grams of Proglyde DMM to form a premix. 0.75 grams of Triton X-405 was added dropwise to 66.1 grams of Comparative Emulsion Polymer 1 while stirring with an overhead mixer, followed by the dropwise addition of CHDA/Proglyde DMM premix, followed by the dropwise addition of 0.20 grams of Byk 346.

Comparative Formulation E

Comparative formulation E was prepared according to the above process, which is further defined below, based on the formulation components reported in Table 8. 0.75 grams of Triton X-405 was added dropwise to 66.1 grams of Comparative Emulsion Polymer 1 while stirring with an overhead mixer, followed by the dropwise addition of 3.0 grams of Proglyde DMM, followed by the dropwise addition of 0.20 grams of Byk 346.

TABLE 8

| | Inventive Formulation 3 | Comparative Formulation C | Comparative Formulation D | Comparative Formulation E |
|---|---|---|---|---|
| Polycarbamate Component 2 | 67.0 | 67.0 | 0 | 0 |
| Comparative Emulsion Polymer 1 | 0 | 0 | 66.1 | 66.1 |
| Triton X-405 | 0.75 | 0.75 | 0.75 | 0.75 |
| DMM | 3.0 | 3.0 | 3.0 | 3.0 |
| CHDA | 1.21 | 0 | 1.35 | 0 |
| Byk 346 | 0.20 | 0.20 | 0.20 | 0.20 |
| Final Formulation pH | 1.3 | 1.3 | 1.3 | 1.3 |

Evaluation of Coatings Derived from Inventive Formulation 3 and Comparative Formulations C-E Films of approximately 1 mil dry film thickness were made from Inventive Formulation 3 and Comparative Formulations C-E approximately four hours after the formulations were made. Inventive Formulation 3 was subsequently aged for three weeks at room temperature, and one additional week at 60° C. and then was used to make a new 1 mil thick dry film. The films were dried under ambient conditions (25° C.) for two weeks before evaluating properties. Koenig (pendulum) hardness was measured according to ASTM D-4366 using a TQC SP0500 Pendulum Hardness Tester, and was reported in seconds in Table 9. Chemical resistance tests were done by placing a 23 mm diameter Whatman filter paper on the coating and saturating it with the chemical, reported in Table 9. The chemical was covered to prevent evaporation for one hour. The chemical and filter paper were removed from the coating by hand and with a mild water rinse. Chemical resistance was ranked 1-5 with 5 representing no visible sign of damage and no noticeable softening of the film, and 1 representing complete dissolution of the coating by the chemical. Chemical resistance was tested for acetone, isopropyl alcohol, a 50/50 mix of ethanol and water, and MEK.

TABLE 9

| Film Made From | Inventive Formulation 3 | Comparative Formulation C | Comparative Formulation D | Comparative Formulation E |
|---|---|---|---|---|
| Konig Hardness | 24.9 | 13.1 | 11.7 | 14.6 |
| Acetone Resistance | 5 | 3 | 3 | 3 |
| MEK Resistance | 5 | 3 | 3 | 3 |
| IPA Resistance | 3 | 3 | 2 | 2 |
| 50% Ethanol Resistance | 2 | 2 | 2 | 3 |

Inventive Formulation 4

Inventive formulation 4 was prepared according to the above process, which is further defined below, based on the formulation components reported in Table 10. 1.21 grams of CHDA was dissolved in 4.5 grams of Proglyde DMM to form a premix. 0.75 grams of Triton X-405 was added dropwise to 66.8 grams of polycarbamate component 3 while stirring with an overhead mixer, followed by the dropwise addition of CHDA/Proglyde DMM premix, followed by the dropwise addition of 0.20 grams of Byk 346.

Comparative Formulation F

Comparative Formulation F was prepared according to the above process, which is further defined below, based on the formulation components reported in Table 10. 0.75 grams of Triton X-405 was added dropwise to 66.8 grams of polycarbamate component 3 while stirring with an overhead mixer, followed by the dropwise addition of 4.5 grams of Proglyde DMM, followed by the dropwise addition of 0.20 grams of Byk 346.

Comparative Formulation G

Comparative Formulation G was prepared according to the above process, which is further defined below, based on the formulation components reported in Table 10. 1.34 grams of CHDA was dissolved in 4.5 grams of Proglyde DMM to form a premix. 0.75 grams of Triton X-405 was added dropwise to 65.7 grams of Comparative Emulsion Polymer 2 while stirring with an overhead mixer, followed by the dropwise addition of CHDA/Proglyde DMM premix, followed by the dropwise addition of 0.20 grams of Byk 346.

Comparative Formulation H

Comparative Formulation H was prepared according to the above process, which is further defined below, based on the formulation components reported in Table 10. 0.75 grams of Triton X-405 was added dropwise to 65.7 grams of Comparative Emulsion Polymer 2 while stirring with an overhead mixer, followed by the dropwise addition of 4.5 grams of Proglyde DMM, followed by the dropwise addition of 0.20 grams of Byk 346.

TABLE 10

| | Inventive Formulation 4 | Comparative Formulation F | Comparative Formulation G | Comparative Formulation H |
|---|---|---|---|---|
| Polycarbamate Component 3 | 66.8 | 66.8 | 0 | 0 |
| Comparative Emulsion Polymer 2 | 0 | 0 | 65.7 | 65.7 |
| Triton X-405 | 0.75 | 0.75 | 0.75 | 0.75 |
| DMM | 4.5 | 4.5 | 4.5 | 4.5 |
| CHDA | 1.21 | 0 | 1.34 | 0 |
| Byk 346 | 0.2 | 0.2 | 0.2 | 0.2 |
| Final Formulation pH | 1.3 | 1.3 | 1.3 | 1.3 |

Evaluation of Coatings Derived from Inventive Formulation 4 and Comparative Formulations F-H Films of approximately 1 mil dry film thickness were made from Inventive Formulation 4 and Comparative Formulations F—H approximately four hours after the formulations were made. Inventive Formulation 4 was subsequently aged for three weeks at room temperature, and one additional week at 60° C. and then was used to make a new 1 mil thick dry film. The films were dried under ambient conditions (25° C.) for two weeks before evaluating properties. Koenig (pendulum) hardness was measured according to ASTM D-4366 using a TQC SP0500 Pendulum Hardness Tester, and was reported in seconds in Table 11. Chemical resistance tests were done by placing a 23 mm diameter Whatman filter paper on the coating and saturating it with the chemical, reported in Table 1. The chemical was covered to prevent evaporation for one hour. The chemical and filter paper were removed from the coating by hand and with a mild water rinse. Chemical resistance was ranked 1-5 with 5 representing no visible sign of damage and no noticeable softening of the film, and 1 representing complete dissolution of the coating by the chemical. Chemical resistance was tested for acetone, isopropyl alcohol, a 50/50 mix of ethanol and water, and MEK.

TABLE 11

| Film Made From | Inventive Formulation 4 | Comparative Formulation F | Comparative Formulation G | Comparative Formulation H |
|---|---|---|---|---|
| Konig Hardness | 87.7 | 83.3 | 69.5 | 89.3 |
| Acetone Resistance | 5 | 2 | 3 | 3 |
| MEK Resistance | 5 | 3 | 3 | 3 |
| IPA Resistance | 5 | 3 | 2 | 2 |
| 50% Ethanol Resistance | 2 | 2 | 4 | 2 |

Dispersion Polymer 1

Dispersion Polymer 1 is Polycarbamate Component 4 in water and dispersed as small particles in the water continues phase according to the following process.

AU 608 Carbamate functional resin (solution in Xylene with 62% Non volatile matter) 100 g was heated to 35-40° C. and mixed with 5 g of Hitenol BC-10 (100% active, a polymerizable anionic surfactant obtained from Montello Inc) in a polyethylene beaker. The content of the beaker was stirred with a cowles type mechanical stirrer at an rpm of ~3500-4000 cpm for ~1 minute to obtain uniform mixing. To this mixture, warm water (water at ~35-40° C.) was added approximately at the rate of 3 ml/minute while maintaining the stirring. As the water addition progressed the viscosity of the mixture increased significantly and eventually, was a thick paste/gel after ~20 ml of water addition. Water addition was suspended for 1-2 minutes while maintaining the stirring to ensure uniform mixing of the high viscous (high internal phase emulsion) mixture. The water addition rate was increased to ~10 ml/minute for next stage (dilution stage) to obtain dispersion with final water content to 50 g. The volume average particle size of the dispersion was measured using a Coulter LS 230 instrument and was shown to measure 2.4 micron. A TGA analysis indicated that Comparative Dispersion Polymer 1 measured a percent solids of 39.7% which resulted in a carbamate polymer equivalent weight for the dispersion as Ew=2233.03 g eq/mole (@39.7% solids).

Inventive Formulation 5

Inventive Formulation 5 comprises (a) 10.0 g of Dispersion Polymer 1; (b) 0.314 g of CHDA; (c) 0.171 g Acid Catalyst 1; and (d) 1 g of NMP (N-methyl-2-pyrolidone). Components a, b and d were placed in a flask, and mixed using a speed mixer to form a clear solution, and subsequently component c was added, and mixed via the speed mixer at approximately 22 deg. C. for approximately one minute.

Inventive Formulation 6

Inventive Formulation 6 comprises (a) 10.0 g of Dispersion Polymer 1; (b) 0.314 g of CHDA; (c) 0.858 g Acid Catalyst 1; and (d) 1 g of NMP (N-methyl-2-pyrolidone). Components a, b and d were placed in a flask, and mixed using a speed mixer to form a clear solution, and subsequently component c was added, and mixed via the speed mixer at approximately 22 deg. C. for approximately one minute.

Inventive Formulation 7

Inventive Formulation 7 comprises (a) 10.0 g of Dispersion Polymer 1; (b) 0.628 g of CHDA; (c) 0.184 g Acid Catalyst 1; and (d) 1 g of NMP (N-methyl-2-pyrolidone). Components a, b and d were placed in a flask, and mixed using a speed mixer to form a clear solution, and subsequently component c was added, and mixed via the speed mixer at approximately 22 deg. C. for approximately one minute.

Inventive Formulation 8

Inventive Formulation 8 comprises (a) 10.0 g of Dispersion Polymer 1; (b) 0.628 g of CHDA; (c) 0.920 g Acid Catalyst 1; and (d) 1 g of NMP (N-methyl-2-pyrolidone). Components a, b and d were placed in a flask, and mixed using a speed mixer to form a clear solution, and subsequently component c was added, and mixed via the speed mixer at approximately 22 deg. C. for approximately one minute.

Comparative Formulation I

Comparative Formulation I comprises (a) 10.0 g of Dispersion Polymer 1; (b) 0.794 g Acid Catalyst 1; and (c) 1 g of NMP (N-methyl-2-pyrolidone). Components a and c were placed in a flask, and mixed using a speed mixer to form a clear solution, and subsequently component b was added, and mixed via the speed mixer at approximately 22 deg. C. for approximately one minute.

Inventive Coated Samples 5 to 8 and Comparative Coated Sample I

Inventive formulations 5 to 8 and comparative formulation A were applied to a steel substrate via a doctor blade having a a gap of 5 mil, and then allowed to air dry for 7 days under ambient conditions to form a single layer Inventive Coated Samples 5 to 8 and Comparative Coated Sample I, respectively. Various standard properties of the Coated Samples 5 to 8 and Comparative Coated Sample I were tested and reported in Table III.

Inventive compositions 5 to 8 and Comparative Composition I were applied to a wood substrate using a foam brush and treated under ambient room temperature conditions as indicated below. The wood was coated, dried for one day, lightly sanded, coated, dried for one day, lightly sanded, coated, and dried for 7 days under ambient conditions before testing. Each Inventive Coated wood sample and comparative coated wood sample were tested and reported in Table 12.

TABLE 12

| Film made from | Inventive Coated Sample 5 | Inventive Coated Sample 6 | Inventive Coated Sample 7 | Inventive Coated Sample 8 | Comparative Coated Sample 8 |
|---|---|---|---|---|---|
| Stoichiometry (CHO: Carbamate group) | 1:1 | | 2:1 | | 0:1 |
| p-Toluentsulfonic acid (% on soilds) | 1 | 5 | 1 | 5 | 5 |
| Film Thickness (mil) | 2.27 | 2.35 | 2.56 | 2.54 | 2.28 |
| Pendulum Hardness (Konig, sec) | 27 | 36 | 32 | 45 | 24 |
| Pencil Hardness (gouge) | 2B | Fail | 6B | Fail | Fail |
| 20° Gloss (GU) | 58.08 | 18.28 | 38.74 | 9.24 | 35.44 |
| 60° Gloss (GU) | 99.14 | 50.34 | 86.36 | 21.88 | 75.76 |
| *Water Resistance 24 h covered water spot test | 4 | 4 | 4 | 3 | 2 |
| Thickness for MEK Resistance | 2.07 | 2.02 | 2.58 | 2.36 | 2.45 |
| | 1.82 | 2.03 | 2.66 | 2.18 | 2.47 |
| NEK Resistance (hammer, double rubs) | 45 | 55 | 70 | 75 | 25 |
| | 50 | 50 | 65 | 55 | 20 |
| Gel Fraction (%, 24 h, acetone) | 58.7 | 62.4 | 53.8 | 61.9 | 0 |
| Stains | Wood Substrate 7 Day Ambient Dry | | | | |
| Skydrol | 3 | 4 | 4 | 4 | 0 |
| Windex | 5 | 5 | 5 | 5 | 3 |
| 50% Ethanol | 5 | 5 | 5 | 5 | 2 |
| Water | 5 | 5 | 5 | 5 | 4 |

Test Methods

Test methods include the following:

Weight average particle size in nanometers (nm) was determined via light scattering using a 90-Plus Particle Size Analyzer from Brookhaven Instruments Corporation.

Percent solids is determined by following ASTM D2369-07 (Standard Test Method for Volatile Content of Coatings (2007)) except as follows. Determinations are done in triplicate. For each determination, weigh from 0.5 g to 0.7 g of sample of material to be tested into a tared aluminum pan and record weight to 0.1 mg accuracy. Cover sample with 3 mL toluene. Place pans into a preheated convection oven at 110° C. for 60 minutes, then reweigh to give weight of residual solids. Calculate percent solids based on weight of residual solids.

Alternatively, percent solids is determined by thermogravimetric analysis (TGA) by placing 10 mg of sample into a standard thermogravimetric analysis unit that has a nitrogen gas purge. Heat the sample from 25° C. to 300° C. at a heating rate of 10° C. per minute (° C./min). From a graph of % weight loss as a function of time curve, use break in slope of the curve where the weight loss levels out as the percent (fraction of) solids.

Thickness of the Coating:

ASTM D7091-05 (Standard Practice for Nondestructive Measurement of Dry Film Thickness of Nonmagnetic Coatings Applied to Ferrous Metals and Nonmagnetic, Nonconductive Coatings Applied to Non-Ferrous Metals (2005)).

Hydroxyl Number:

Determined by following ASTM D4274-05 (Standard Test Methods for Testing Polyurethane Raw Materials: Determination of Hydroxyl Numbers of Polyols (2005)) and is expressed as number of milligrams of potassium hydroxide (KOH) per gram of test substance (mg KOH/g).

Gloss:

measurements are made with a BYK Labotron Gloss Unit following ASTM D523-08 (Standard Test Method for Specular Gloss (2008)).

Impact Resistance:

is determined by using a Gardner impact tester and following ASTM D2794-93 (Standard Test Method for Resistance of Organic Coatings to the Effects of Rapid Deformation (Impact) (1993)).

Abrasion Resistance:

using a Taber abrader (CS-17 wheels, 1000 g weights, 500 cycles).

Pendulum Hardness:

according to the Konig pendulum hardness test by following ANSI ISO1522 (Pendulum damping test).

Pencil Hardness:

ASTM D3363-05 (Standard Test Method for Film Hardness by Pencil Test (2005)).

Acid Etch Resistance:

Determined by placing drops of a 10% solution of $H_2SO_4$ on a surface of a coating, waiting for 2 hours, observing visual effect on the coating and categorizing the visual effect as either no effect, moderate etch, or severe etch. No effect means no change to coating surface, moderate etch means whitening of the coating surface, and severe etch means blistering of the coatings surface.

Water Penetration Resistance:

(of a coating) Determined by placing drops of deionized water on a surface of a coating, covering the drops with a glass cover, waiting for 24 hours, observing visual effect on the coating, and categorizing the visual effect as either no effect, moderate etch, or severe etch. No effect means no change to coating surface, moderate etch means whitening of the coating surface, and severe etch means blistering of the coatings surface. Assign a relative rating of from 1 to 6, with 6 being highest water resistance and 1 being lowest water penetration resistance, characterized as follows:
 1=Cut through, dissolves coating, cracks/peels away.
 2=Water corrodes substrate.
 3=Severe blushing, forms bubbles/wrinkles.
 4=Mild blushing/yellowing, no change to touch.
 5=No effect, visible or otherwise.
 6=No effect, never even blushed.

Solvent Resistance or MEK Test:

(of a coating) Reported as the number of methyl ethyl ketone (MEK) back and forth rubs that are required to remove enough of the coating down to and thereby exposing the surface of the substrate.

Solubility of the Polyaldehyde in Water:

ASTM E1148-02 (Standard Test Method for Measurements of Aqueous Solubility (2002)).

Cross-Hatch Adhesion:

ASTM D3359-09 (Standard Test Methods for Measuring Adhesion by Tape Test) (scale 0B to 5B with 5B being the best adhesion).

Stain Resistance:

(of the coating) R is determined by placing drops of the insult material (water, 50% ethanol/water, skydrol, and windex) onto a piece of absorbant paper that is in direct contact with the coating surface, covering the thoroughly wetted paper with a glass cover, waiting for 24 hours, observing visual effect on the coating, and categorizing the visual effect as either no effect, moderate etch, or severe etch. No effect means no change to coating surface, moderate etch means whitening of the coating surface, and severe etch means blistering of the coatings surface. Assign a relative rating of from 1 to 6, with 6 being the most severe damage and 1 being lowest with no affect to the coating, characterized as follows:
 1=Cut through, dissolves coating, cracks/peels away.
 2=Water corrodes substrate.
 3=Severe blushing, forms bubbles/wrinkles.
 4=Mild blushing/yellowing, no change to touch.
 5=No effect, visible or otherwise.
 6=No effect, never even blushed.

Gel Fraction:

(of the coating material) Reported as the % of a film sample that remains after 24 hours of exposing a polymer film in a Soxletextractor with refluxing acetone. A film sample is prepared using the same formulation as the coating and is pored into an aluminum foil boat to make a dried coating thickness of ~0.1 mm. The cured film is pealed from the foil and ~1 g of film is placed into a Soxhlet extractor thimble and an accurate weight is recorded. The thimble/film sample is paced into a Soxhlet extactor using acetone as the refluxing solvent. The sample is extracted for 24 hours using the refluxing acetone. The thimble/film sample is removed, allowed to dry overnight and weighed. The percent of material remaining after the extraction is calculated.

The present invention may be embodied in other forms without departing from the spirit and the essential attributes thereof, and, accordingly, reference should be made to the appended claims, rather than to the foregoing specification, as indicating the scope of the invention.

We claim:

1. A crosslinkable composition comprising: an aqueous dispersion comprising; water; a polycarbamate comprising at least an average of 2.0 carbamate functional groups; a polyaldehyde comprising at least two aldehyde groups; and an acid catalyst; and optionally one or more surfactants; wherein said aqueous dispersion has a pH in the range of less than 7; and wherein the polyaldehyde has greater than 20 carbon atoms, with the proviso that a polyaldehyde having greater than 20 carbon atoms has at least one aldehyde group for every 30 carbon atoms.

2. The crosslinkable composition of claim 1, wherein said composition is capable of being crosslinked at a temperature in the range of less than 80° C.

3. The crosslinkable composition of claim 1, wherein said composition is capable of being crosslinked at a temperature in the range of less than 40° C.

4. The crosslinkable composition of claim 1, wherein said aqueous dispersion has a pH in the range of less than 4.

5. A crosslinkable composition of claim 1, wherein the said aqueous dispersion remains a stable dispersion for at least 30 days, while remaining suitable for its intended purpose.

6. A crosslinkable composition of claim 1, wherein the said aqueous dispersion is heat stable at 60 C for a period of 10 days, while remaining suitable for its intended purpose.

7. The crosslinkable composition of claim 1, wherein said composition is capable of being crosslinked upon substantial removal of water.

8. The crosslinkable composition of claim 1, wherein the polycarbamate is the condensation product of one or more polyols with an unsubstituted carbamic acid alkyl ester or urea.

9. The crosslinkable composition of claim 8, wherein the polyol is an acrylic, styrene-acrylic, styrene-butadiene, ethylenevinylacetate, vinylacetate, vinyl, saturated ester, urethane, alkyd, ether or carbonate polymer or oligomer thereof.

10. The crosslinkable composition of claim 1, wherein the polycarbamate has carbamate groups and hydroxyl groups in a ratio of the equivalents of carbamate groups to the number of equivalents of hydroxyl functional groups of from 1:10 to 20:1.

11. The crosslinkable composition of claim 1, wherein the polycarbamate is prepared via free radical emulsion or suspension addition polymerization of one or more .alpha., .beta.-ethylenically unsaturated monomers at least one of which comprises carbamate functionality.

12. The crosslinkable composition of claim 1, wherein the acid catalyst has a pKa of less than 6.0.

13. The crosslinkable composition of claim 1, wherein the acid catalyst has a pKa of less than 4.0.

14. The crosslinkable composition of claim 1, wherein the acid catalyst is Lewis acid.

15. The crosslinkable composition of claim 1, wherein said composition further comprises a curing inhibitor comprising alcohol.

16. The crosslinkable composition of claim 15, wherein said alcohol is selected from the group consisting of ethanol, 1-propanol, 1-butanol, 1-pentanol, Ethylene glycol monoalkyl ethers, diethylene glycol monoalkyl ethers, propylene glycol monoalkyl ethers and dipropylene glycol monoalkyl ethers, 2,2,4-Trimethyl-1,3-pentanediol monoisobutyrate, combinations thereof, and mixture thereof.

17. The crosslinkable composition of claim 1, wherein said carbamate functional group has a radical structure of formula of:

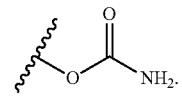

18. A crosslinked composition comprising the crosslinked product of the crosslinkable composition of claim 1.

19. A process for producing a crosslinkable composition comprising: selecting a polycarbamate dispersion comprising (a) a polycarbamate comprising at least an average of 2.0 carbamate functional groups, (b) water, and (c) an acid catalyst; selecting a polyaldehyde comprising at least two aldehyde groups wherein the polyaldehyde has greater than 20 carbon atoms, with the proviso that a polyaldehyde having greater than 20 carbon atoms has at least one aldehyde group for every 30 carbon atoms; contacting said polycarbamate dispersion with said polyaldehyde in the presence of said water; thereby forming an aqueous dispersion, wherein said aqueous dispersion has a pH in the range of less than 7.

20. A process for producing a crosslinkable composition 19, wherein the acid catalyst is a functional group which is incorporated into the backbone of the polycarbamate.

21. A process for producing a crosslinkable composition comprising: selecting a polycarbamate dispersion comprising a polycarbamate comprising at least an average of 2.0 carbamate functional groups, and water; selecting a polyaldehyde comprising at least two aldehyde groups wherein the polyaldehyde has greater than 20 carbon atoms, with the proviso that a polyaldehyde having greater than 20 carbon atoms has at least one aldehyde group for every 30 carbon atoms; selecting an acid catalyst; contacting said polycarbamate dispersion, polyaldehyde, and acid catalyst in the presence of said water; thereby forming an aqueous dispersion, wherein said aqueous dispersion has a pH in the range of less than 7.

* * * * *